US011004302B2

(12) United States Patent
Okuniewicz

(10) Patent No.: US 11,004,302 B2
(45) Date of Patent: May 11, 2021

(54) DATA STORAGE SYSTEM FOR AN ELECTRONIC GAMING DEVICE

(71) Applicant: AIM MANAGEMENT, INC., Post Falls, ID (US)

(72) Inventor: Douglas M Okuniewicz, Las Vegas, NV (US)

(73) Assignee: AIM Management, Inc., Post Falls, ID (US), part interest ( * ) Notice: Subject to any disclaimer, the term of this patent is extended or adjusted under 35 U.S.C. 154(b) by 0 days.

(21) Appl. No.: 16/728,942

(22) Filed: Dec. 27, 2019

(65) Prior Publication Data

US 2020/0211320 A1 Jul. 2, 2020

Related U.S. Application Data

(63) Continuation of application No. 11/057,801, filed on Feb. 14, 2005, now Pat. No. 10,540,842, which is a continuation-in-part of application No. 11/033,611, filed on Jan. 11, 2005, now abandoned.

(51) Int. Cl.
*A63F 13/00* (2014.01)
*G07F 17/32* (2006.01)

(52) U.S. Cl.
CPC .......... *G07F 17/3218* (2013.01); *G07F 17/32* (2013.01)

(58) Field of Classification Search
CPC ............. G07F 17/3255; G07F 17/3239; G07F 17/3218; G07F 17/3232
See application file for complete search history.

(56) References Cited

U.S. PATENT DOCUMENTS

2002/0077178 A1* 6/2002 Oberberger ............ G06Q 20/02 463/42
2002/0196342 A1* 12/2002 Walker .................... G07F 17/32 348/157
2003/0003988 A1* 1/2003 Walker .................. G06Q 30/02 463/21

* cited by examiner

*Primary Examiner* — David L Lewis
*Assistant Examiner* — Eric M Thomas
(74) *Attorney, Agent, or Firm* — Jonathan C. "Rudy" Hill; Ryan J. Letson; Bradley Arant Boult Cummings LLP

(57) ABSTRACT

A data storage system for an electronic gaming device has been developed. The system includes a portable electronic memory device and player data that is stored on the memory device. The player data is generated by an electronic gaming device upon engagement of the game by the player.

2 Claims, 7 Drawing Sheets

DATA STORAGE SYSTEM FOR AN ELECTRONIC GAMING DEVICE

CROSS-REFERENCE TO RELATED APPLICATIONS

This application is a continuation of U.S. patent application Ser. No. 11/057,801, entitled "Data Storage System for an Electronic Gaming Device" and filed on Feb. 14, 2005, which is a continuation-in-part of U.S. patent application Ser. No. 11/033,611 entitled "A Data Storage System for an Electronic Gaming Device" and filed Jan. 11, 2005. Each of the foregoing is hereby incorporated by reference herein in its entirety.

BACKGROUND OF INVENTION

Field of the Invention

The invention relates generally to electronic gaming device. More specifically, the invention relates to a data storage system for an electronic gaming device.

Background Art

Slot machines and video poker machines continue to be the most widely used types of gaming devices found in the gaming industry. The oldest slot machines and video poker machines were relatively simple devices which included little in the way of sound generating devices, commonly including only a bell or buzzer to signify a winning combination on the reels. With the advent of new technology in the gaming industry, the slot machines and video poker machines were now able to produce a variety of pre-programmed sounds and video through the use of computer chip technology. These pre-programmed sounds and video are of significant importance to maintaining player interest in a particular gaming machine. Consequently, changes or updates to any of the game features including video, audio, bonusing systems or of the game itself are important. As a result, the ability to change electronic games as quickly and as easily as possible to meet evolving player tastes is necessary.

SUMMARY OF INVENTION

In some aspects, the invention relates to a data storage device for a player of a gambling game, comprising: a portable electronic memory device; and player data that is stored on the memory device, where the player data is generated by an electronic gaming device upon engagement by the player.

In other aspects, the invention relates to a data storage device for a player of a gambling game, comprising: a portable electronic memory device; and means for storing player data on the memory device, where the player data is generated by an electronic gaming device upon engagement by the player.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1A:
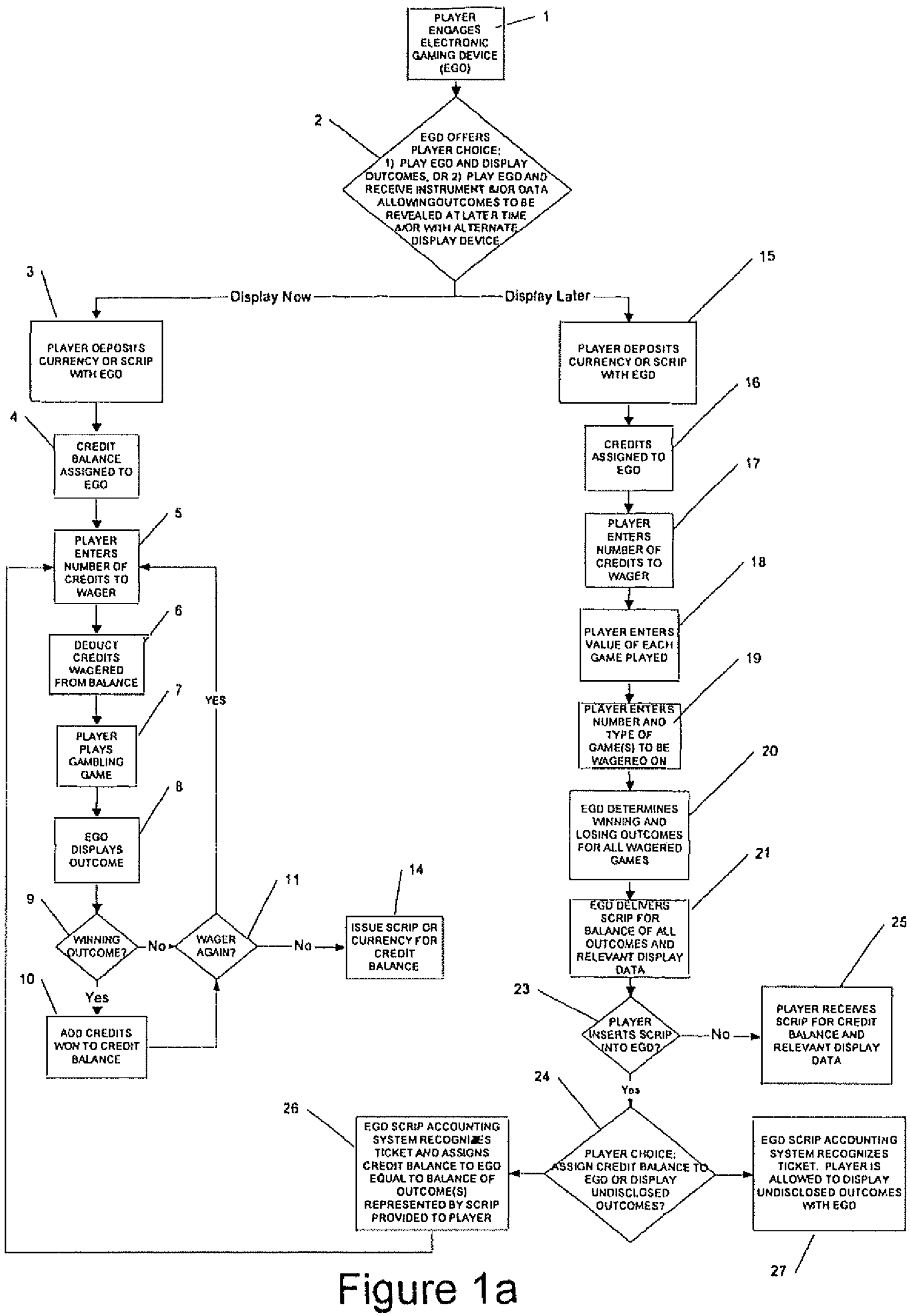
FIG. 1*a* shows a flow chart of an example of the play of an electronic gaming device that may generate an undisplayed outcome in accordance with one embodiment of the present invention.
Figure 1B:
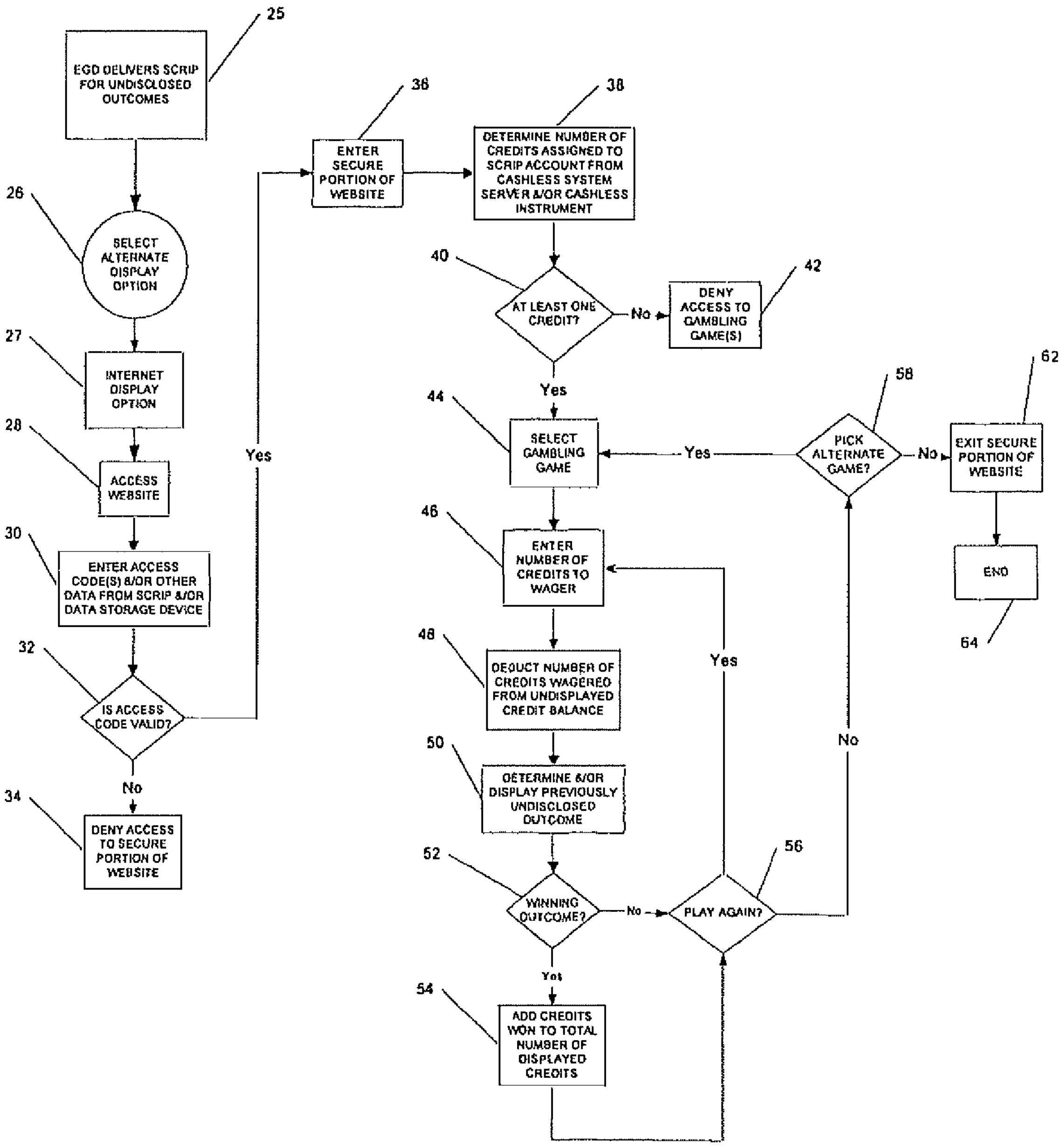
FIG. 1*b* shows a flow chart of an example of the use of an alterative display option for an undisplayed outcome in accordance with one embodiment of the present invention.

FIGS. 1*a* and 1*b* show examples of how, with the present invention, a player can play an electronic gaming device (EGD) in a traditional way or in a fashion that results in the player receiving at least one undisplayed outcome. Specifically, a player can play an EGD in a fashion that results in the player receiving at least one undisplayed outcome in a manner where the undisplayed outcome can be revealed by an alternate outcome display device and/or system. The credit balance associated with an undisplayed outcome may or may not be shown to the player depending on the programming of the display device and/or system and/or the player's choice prior to displaying the outcomes.

Figure 2:
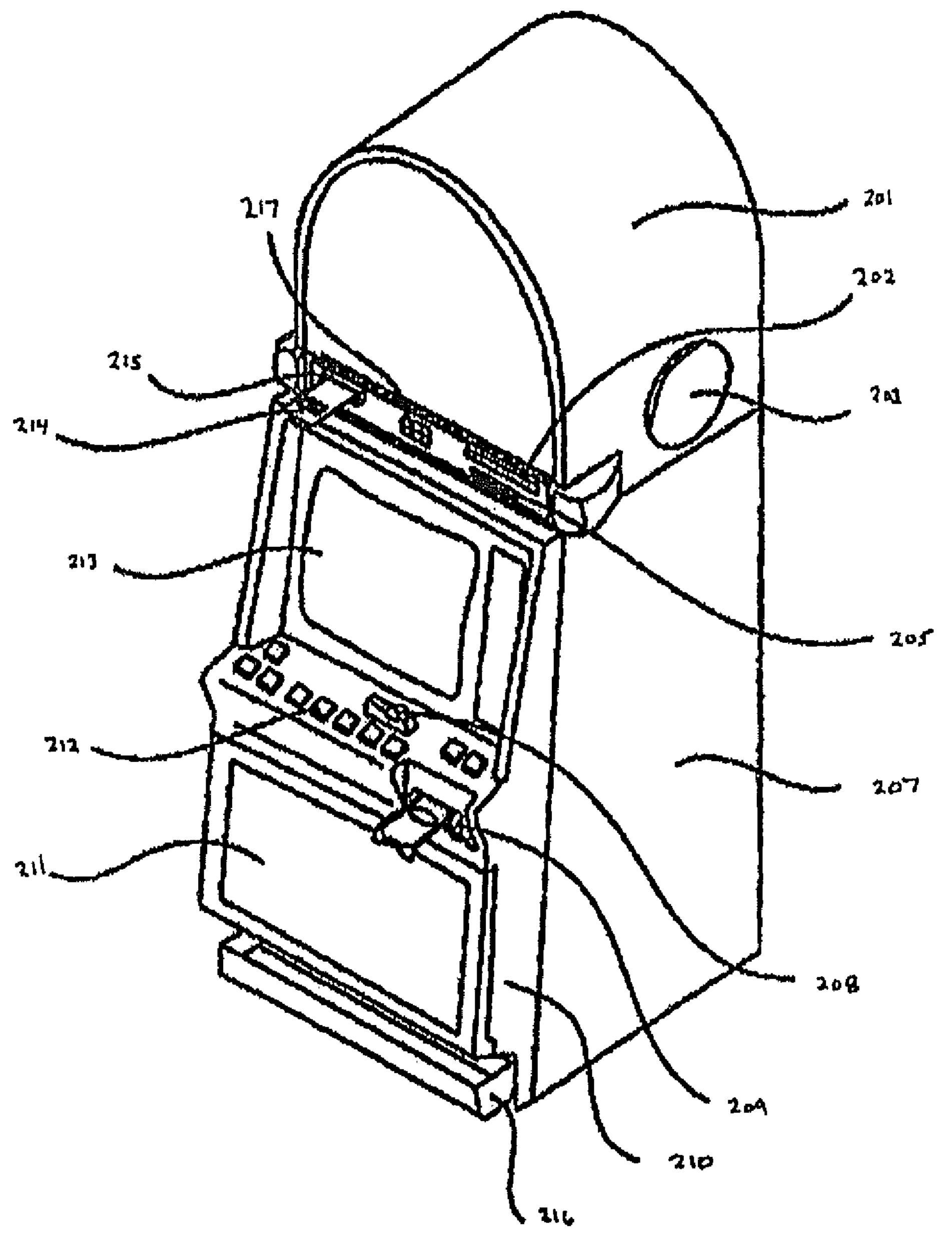
FIG. 2 shows a view of an example of an electronic gaming device in accordance with one embodiment of the present invention.

FIG. 2 is a drawing of an example of a video poker version of an EGD. The external structure is comprised of a main cabinet 207, top box 201, main door 210, and front panels made up principally by the belly glass 211, and a display area (a video display monitor, in this case) 213. The player controls are represented by input switches and buttons 212 and the player tracking system key pad 217 (most video displays also function as a player control using "touch screen" technology and the display 213 is considered a player control as well as a display for the purposes of this disclosure). The bill validator 209 accepts paper currency and also functions as a scrip accepting and validating device. The coin acceptor 208 accepts coined currency and tokens. The ticket printer 215 issues scrip 214 for credit balances and data related to undisplayed outcomes as well as bonuses of various types. The externally viewable portions of the player tracking system are at least the previously mentioned keypad 217, the player tracking display 202, and the player tracking card reader 205. Also shown are speakers 203 to output programmed audio for the games as well as specific audibilized player instructions. Lastly, there is a coin tray 216.

It is to be understood that the present invention can be used with any type of EGD and the video poker machine is merely used as an example. Other common examples of EGDs that can be used with the present invention are: slot machines with physical reels and/or video displays, video lottery terminals (VLTs), video blackjack machines, video poker machines, bingo machines, keno machines, etc.

The first mode of play involves the player depositing a wagering instrument, (e.g., scrip, coin, token, paper currency, digital based currency such as credit cards, smart cards, or any other credited digital or data based medium) making a wager and manipulating the player controls, if necessary or desirable, to cause the EGD to determine the outcome for the wagered game and display the outcome to the player in a form relevant to the game (e.g., reels spinning and stopping, cards dealt, drawn, folded, etc; bingo, keno, lottery or sweepstakes drawings, etc; bonuses, multipliers, or any other representation, indicia or image, physical or simulated, of a predetermined, wholly skill based, or an at least partially randomly determined, outcome represented as a gambling game or one of its features). If, for example, the outcome is a winning outcome, the winnings are credited to the EGD's credit balance. If the outcome is a losing outcome the player loses his wagered credits. In either case, the player may play again or cash out depending on whether or not the EGD maintains a credit balance for future wagers. It should be understood that the wide variety of wagering instruments and games that are known in the art may be used in different embodiments of the present invention.

The second mode of play involves a player similarly depositing a wagering instrument in order to create a balance of credits in the EGD. Once the EGD has a credit balance the player may make a series of qualifying selections that result in the EGD determining at least one outcome for a least one chosen wagering game and/or at least one bonus game. In this example, the EGD outcome(s) is/are not displayed to the player, either by choice or design (e.g., the reels are not visibly spun and stopped, cards are not visibly dealt nor drawn, folded, etc; bingo, keno, lottery or sweepstakes drawings, etc; bonuses, multipliers, or any other indicia or image, physical or simulated, of a predetermined, wholly skill based, or an at least partially randomly determined, outcome represented as a gambling game or one of its features, etc.). In this embodiment, once the EGD determines the outcome(s) for the specific game(s), the undisclosed outcome(s) and/or related access device(s) and/or relevant data is/are delivered to the player via a data based medium, in this case a printed ticket.

For this example, the printed ticket will be one that is compatible with ticket-in, ticket-out (TITO) systems. It is to be understood that TITO compatibility is not a requirement for the present invention. It is used here by example only. Any suitable system known in art that provides cashless instruments for payment of credit or cash balances, bonuses, prizes, merchandise, etc. may be employed. The printed ticket will contain the necessary identification components for the TITO system to recognize it once it is offered for redemption in a TITO compatible EGD, or it is otherwise redeemed with a TITO system supported device, in the absence of an alternate form of payment (e.g., coins, handpay, etc.). The ticket has a credit value equal to the net credit balance of the undisclosed wagering outcome(s). The ticket also contains at least a portion of the information required to allow the holder of the ticket to reveal the undisclosed outcome(s) for the purchased wagering game(s) at a later time with or without a casino EGD. The information on the ticket may include a website address, access codes, outcomes, outcome presentation data, player identifying information or any other information or data that allows access to a data file containing the corresponding credit balance and/or outcome information of all types, etc. The data file may be stored in memory in the EGD, a central memory storage location that is part of a network, etc.

Some jurisdictions may require that the value of the ticket be prominently displayed or be readily viewable. However, in order to preserve a player's level of anticipation prior to revealing his undisclosed outcomes and their cumulative value, techniques that conceal the value printed on or otherwise imbued to the ticket may be employed. One example is to print the amount with an ink or in a treated or specifically manufactured area of the ticket that renders the representative characters invisible to the naked eye until a catalyst is employed. The catalyst could be light waves, as from a black light, that render the characters legible, a chemical, the act of scratching, etc. Another example involves using stock with a removable "carbon paper" type layer where the value of the ticket will have been transferred to the substrate adjacent to the "carbon paper". Peeling away the "carbon paper" layer, which will have transferred alpha numeric characters to a substrate of the ticket in response to pressure, heat, light, or other activating agent, action and/or device, will reveal the value of the ticket.

In one example, the player can receive a copy of a program specifically designed to display the outcomes through one of the player's electronic devices like a PC, cellular telephone, XBOX, or PDA. This program could be gifted to the player or purchased by the player in the form of traditional software media (e.g., CD, DVD, game console disk for video game platforms, etc.) or it could be offered as a download to a device with a display such as a cellular phone, PDA, hand held game console, PC, etc. The outcomes could also be displayed via an interactive DVD or interactive TV programming for use with a television or other compatible monitor. Many of the devices, such as the hand held game console, may also be specifically manufactured and programmed for this purpose. The display program may also be accessible via the Internet or directly from the EGD.

The previous example referencing the display program for undisclosed outcomes being delivered from the EGD of the present invention to the player is an example of a data based award (DBA) of the present invention. In that example, the display program may be delivered to the player via any suitable data transfer system such as those with physical connections or wireless connections. For example, a USB port, or other digital media reader and/or writer, located in an easily accessible position on the EGD is a suitable connection point. With this sample connection point, the DBA could be transferred through the USB port to any compatible device including: USB flash drives, secure digital (SD) memory cards, other compact flash devices, PDAs, cellular telephones, hand held game consoles, or any electronic storage medium or device capable of connecting directly, or through a USB cable, to the EGD.

Another example involves a system (e.g. player tracking, cashless, web based, purpose built DBA delivery system) or an EGD sending a DBA to a player's email account, cellular telephone, PDA, etc. upon the player earning, winning, or otherwise qualifying for the DBA. This can be accomplished by using stored player contact information so long as the player has been identified by the system, EGD, etc. prior to his qualifying for the DBA. The information could also be provided to the system, EGD, etc. by manually inputting the information via an input of the system, EGD, etc. or the necessary contact information could be sent via a cellular phone, email program, text messaging, etc. to the system, EGD, etc. upon request.

A DBA may be an entire program, complete content, etc. or it may constitute a digital key of some type that provides access to a downloadable award and/or unlocks a downloadable award or unlocks an award delivered in, and/or contained by, another form such as CD, DVD, or any other storage media. Examples of data based awards include: all types of software for PCs (e.g. game programs, business software, word processors, photography programs, entertainment programs, EGD outcome display programs, undisclosed EGD outcomes or any other software based applications, etc.), GPS programs, cellular phone programming (e.g. ring tones, screensavers, games, undisclosed EGD outcome display programs, undisclosed EGD outcomes, etc)).], audio files (e.g. MP3, WMA, AAC files, etc.), video games, additional video game content, movies, TV episodes, undisclosed outcomes for EGDs, display programs for undisclosed EGD outcomes, player tracking points, bonus games, image files or any digitized or data based item, etc.

For example, an EGD may be themed after a movie such as Star Wars®. In this case, after a particular award is won or earned (e.g. through game play outcomes, bonusing, player tracking measures, etc.), the EGD would provide a copy of the movie, or a digital key, to a player's digital storage device as a form of a payout or bonus. The copy of the movie, or some type of digital key used for downloading or retrieval of the movie from the Internet, a kiosk or other partially, or wholly, automated distribution center, can be saved directly to a player's digital storage device and/or medium such as a USB flash drive, for example. In one example, the movie could be accessed by a player with his home PC connected to the Internet. A digital key stored in a USB flash drive can be programmed to automatically connect to the appropriate web site and initiate downloading of the movie to the player's PC upon insertion of the flash drive to a USB port on, or connected to, the player's PC. The movie could then be downloaded to the player's PC and/or to a preferred storage media such as a DVD disk. A digital key may also be a code or password that allows access to a web page that provides the appropriate downloads.

Similarly, a display program for displaying undisclosed EGD outcomes can be downloaded to a player's data storage device in whole or part. A digital key can also be provided to the player's data storage device that allows access to an appropriate website for downloading and/or operating the display program. The display program would be programmed to display the player's undisclosed EGD outcomes as they were provided or in various other forms.

Another example of data based awards are audio files containing music, audio novels, etc. Again, any compatible electronic transfer and storage device may be employed to receive the award from the EGD. One example would be a digital audio player such as an MP3 player to store the audio files directly from the EGD or a kiosk or other partially, or wholly, automated distribution center. Audio files, like all examples of data based awards, could also be downloaded from the Internet with a digital key, proprietary website link, or the like, or they could be delivered by an award distribution center after the player provides a digital key.

Automated distribution centers, such as a kiosk, can deliver DBAs upon receipt of a digital key and/or command from: a player, a cashless instrument, a digital storage device, an EGD, a central determination system (CDS), a player tracking system, a cashless system, a display program for an undisclosed outcome, a website, or any other system connected to an EGD. The digital key may also contain commands for the distribution center that instruct the center which data based award to deliver and in what form, fashion, etc. Interconnected data based award distribution systems may be comprised using any number of the above items and/or additional items.

The EGD of the present invention can also deliver to a player's digital storage medium and/or device player tracking points and/or all manner of the player's account information and/or a digital key that allows a player to access his player account. In one example, the player account access is an award in the form of a manageable player account and/or player account program. The player account may be available on-line via a website or off-line for use with the player's PC, PDA or other compatible electronic device that receives, stores, organizes, retrieves and displays the player's player account data. Additionally, it is to be understood that the player's data storage device can be used to store and deliver credit balance information to an EGD for play or to a redemption device (including EGDs) for cashing out.

The EGD of the present invention is compatible with player data storage devices of the present invention that are capable of combining: all player tracking data, all EGD accounting data (including all scrip related data), all data based award data and all undisclosed outcome data. Examples include such measures as coin-in, coin-out, number of visits, time/dates of visits, games played, all types of point balances, player identification data, game outcomes, DBA file type, etc.

The data storage devices will be programmable and capable of segmenting various data and functions with appropriate access limitations for security purposes using various programming and/or circuitry tools and/or configurations including logic gates, application programming interfaces (APIs), HKEYs, hashing, etc. Such a device will also be capable of storing and updating information that is opaque to the player. Such information can be retrieved and used by an operator, or its agent, for business analyses of the player or portions of it can be used for the player's tax purposes, for example. The retrieval of all information by the operator can occur at an EGD, point of sale, redemption center, etc. upon connection of the data storage device, a telecommunication connection or via the Internet when the player has connected the device to an Internet compatible device such as a PC, cellular phone, PDA, game console, etc.

The information retrieved will include all traditional, player tracking measures accumulated while the player utilizes an operator's in-house attractions and also include information from EGDs, table games, sports betting, simulcast wagering, retail purchases, complimentaries or "comps" redeemed and/or acquired (comps may be credited directly to the data storage device by a host with an electronic device designed for that purpose, by an EGD, by a player account interface [in-house and/or on-line], etc.); and Internet activity including, display program activity for undisclosed outcomes, activity on the operator's website, general and/or specific Internet data mining information, etc. A DBA sent to a cellular phone, for example, could be a screensaver with a particular appearance and/or message that is recognizable by casino staff as good for a complimentary dinner, show or other type of pass, ticket or coupon and/or otherwise representative of a player's status.

Any use of the data storage device can be retrieved. It is to be understood that the data storage device is capable of receiving and storing data, such as that listed above, in a segmented or un-segmented fashion, with or without onboard programming, for ultimate retrieval by the operator, an agent of the operator and/or the player. Certain portions of the data storage device may only be accessible to entities, devices and/or systems as designated by the operator, its agent or the player. The device may include security measures and/or mechanisms to prevent access by unauthorized parties. Such measures may include requiring an access code, such as a personal identification number from the player, to be entered at any or all points of use, such as at an EGD, PC, alternate display device, payment center, award distribution center, etc. or biometric measures such as a fingerprint reader on the storage device or EGD, for example, where the owner's fingerprint can be compared to one that is stored in the storage device or in a system file associated with the storage device may be included.

The data storage device also can contain programs that will automatically boot once the device is connected to a processing device such as a PC, cellular phone, PDA, game console, digital audio player, hand held game, EGD, player tracking system, etc. For example, upon connection to the player's home PC a bootable program may automatically take the player to a particular website, deliver a particular message, etc. Additionally, a program that tracks and saves the activity on the data storage device may send tracked activity to a player tracking system via the Internet, telephone networks, etc. Another example is when a player connects his data storage device to an EGD; a bootable command may be delivered to the EGD's processor to initiate a bonus game, a personal welcome, player identification, a player tracking routine, or an audio and/or visual output, or other output, in response to a player's activity in the casino, away from the casino, on-line, any other activity conducted with the data storage device, etc. Another example allows a player to have, choose, or automatically boot custom audio and video display options for an EGD such as applying computer "wallpapers" to the EGD while he is engaging the EGD.

In order to display undisclosed outcomes, information from the player's cashless instrument will need to be transferred to the display device and/or system. The player may also be required to provide some amount of identifying information such as a personal identification number (PIN), user ID, password, name, phone number, address, etc. Once the display mechanism and/or system has the information or access to the information it needs, including the outcome(s) and/or cumulative balance of the outcome(s) relative to the purchased wager(s), the player is able to engage the mechanism's player controls in a similar fashion as he would engage an EGD's player controls. At this point the player is able to "replay" the previously wagered game(s) with the previously determined, undisclosed, outcomes displaying them at his leisure in a location of his choice.

Using the example in FIG. 1*a*, a player first engages the EGD 1 by selecting the mode of play desired 2. If the player chooses to display the outcomes, the EGD will play in a conventional manner 3-14. Assuming the player chooses to purchase $300 worth of wagers for a corresponding number of undisplayed outcomes, he will first deposit currency or credits 15. Once deposited, the credits will be assigned to the EGD for play or cash out 16. At this point, the player will have the option to make a series of qualifying selections 17, 18 and 19, such as selecting the value of each wager and/or the number of games to be wagered on, and/or the specific game or games to be wagered on. The qualifying selections 17, 18 and 19, may not be required in some instances. For example, an alternate outcome revelation program may only work with a specific game and/or a specific wager amount. The program may only replicate the exact game from which the unrevealed outcomes were purchased.

For the purposes of this example, the player chooses one hundred $3 wagers which, in this case, constitute 100 "max-coin" wagers. Once qualifying selections have been made, either automatically or by the player, the outcome determining mechanism associated with the EGD, be it a component of the EGD or part of a centralized determination system where the EGD is simply a client terminal and display for the system, determines the winning and losing outcomes for each of the 100 wagers 20, more or less instantly from the player's perspective, without disclosing any of the outcomes to the player.

Thereafter, for this example, the EGD prints at least one ticket of the type used with ticket-in, ticket-out (TITO) systems. If one ticket is printed, the ticket will be coded with the cash out balance from the player, in this case, $300 minus the sum of all wagers lost, plus the sum of all wagers won 21. If multiple tickets are printed, the sum of the tickets will also equal $300 minus the sum of all wagers lost, plus the sum of all wagers won 21. Additionally, the at least one ticket, and/or a related ticket(s) issued separately, will also contain some additional components required to enable the revealing of the 100 game outcomes away from the EGD 25 or at a later time with the EGD 27. Some of the additional ticket components necessary for revelation of the outcomes can be identifiers specific to the player such as player tracking account information, digital codes, and/or printed codes intended to aid later access to outcome revealing devices (and/or their systems) such as PCs, cellular phones, PDAs, video game console platforms (XBOX, PS2, Gamecube, etc.), hand held video game platforms (Gameboy, Sony PSP, Nintendo DS, etc.), Internet websites, interactive TV, EGDs, etc.

TITO tickets are used in many of the examples contained herein, however, it should be noted that the terms such as "ticket", "scrip" and "cashless instrument" are interchangeable as used herein so long as the specific media type employed can transport the data necessary for the present invention. Though paper tickets are the prevailing media in use today it is to be understood that any alternative that is capable of storing, transporting and/or delivering the data necessary are intended for use with the present invention. Some examples of alternate media are: smart cards, magnetically striped cards, RFID equipped devices or tickets, wireless communication devices like cellular phones and PDAs, DVDs, CDs, USB flash memory devices, secure digital (SD) memory cards, other flash or compact flash devices, etc.

It is to be understood that TITO systems vary somewhat from manufacturer to manufacturer and version to version. Typically, there will be a plurality of EGDs that are connected to a centralized accounting system, also known as a cashless system. The accounting system will code tickets with secure identifying information and representative value, usually with a bar code, printed numerals and/or alphabetic characters as they are printed. The system will contemporaneously create a matching liability file for the un-cashed scrip account, which will remain open, until the ticket is redeemed by an EGD or other device connected to the system or it expires. Upon redemption, the ticket is compared to the outstanding liability file and, if they match, credits, currency or some other equally valuable instrument will be delivered or credited to the holder of the ticket. Redemption can occur via an EGD or other device connected to the system, the EGD, or manually with a casino cashier who has access to the system.

Continuing with the example shown in FIG. 1*a*, the player may use the at least one ticket at any time with a TITO capable device that is part of the same system from which the ticket(s) was/were issued 23. Upon insertion of the ticket(s), the player may assign the credit balance to the selected device such as an EGD for further play 26 or display the outcomes with the device 27. If the balance is assigned to a device for further play, the associated credit balance, if any, will be credited to the machine in a normal fashion 26. It is also possible that the ticket may not be tenderable for a given period and/or until the outcomes have been revealed by the player depending on the EGD operator's preference.

An alternative 25 is for the player to take his scrip that contains at least a portion of the data representing the sum of his wagers, winnings and losses and/or at least a portion of the data that will provide access to an alternate outcome revealing device and/or system away from the EGD to employ at his leisure. An example of this alternative is depicted in FIG. 1*b*. In this option, the player accesses a display program located on a secure website. (There are many other options including: other EGDs, internet websites, off-line programming (e.g., a home computer with the appropriate software), cellular phones, game consoles, PDAs, etc.) In this example, the player accesses the website 28, and validates the scrip 30 containing the undisplayed outcome data. If the access code is invalid 32, the player is denied further access to the website 34. Once the player correctly validates the scrip, further access to the website is granted 36 and the balance of the scrip account, if any, is loaded as credits 38. The player may be given the option of selecting different gambling games 44 if they are available and supported by the website. The player then makes the qualifying selections for the gaming wagers 46 and 48. Next, the website simulates the determination of an outcome of the gambling game 50. In this example, it is important to understand that the outcome determination is only simulated for the player's enjoyment and entertainment. The actual outcome has already been determined by the EGD as shown in FIG. 1*a*. After the outcome of the wager is displayed 50, the player may continue to play the game 56, or play an alternative game 58, until the credit balance of the undisplayed outcome is exhausted. Once play stops, the player may exit the website 62 by simply "logging out". It is possible in some embodiments of the invention for the player to exit the website 62 with only some of the outcomes displayed. In this case, the scrip account can be updated for later access by the player 60. This can continue until all of the outcomes are eventually displayed to the player.

Figure 1C:
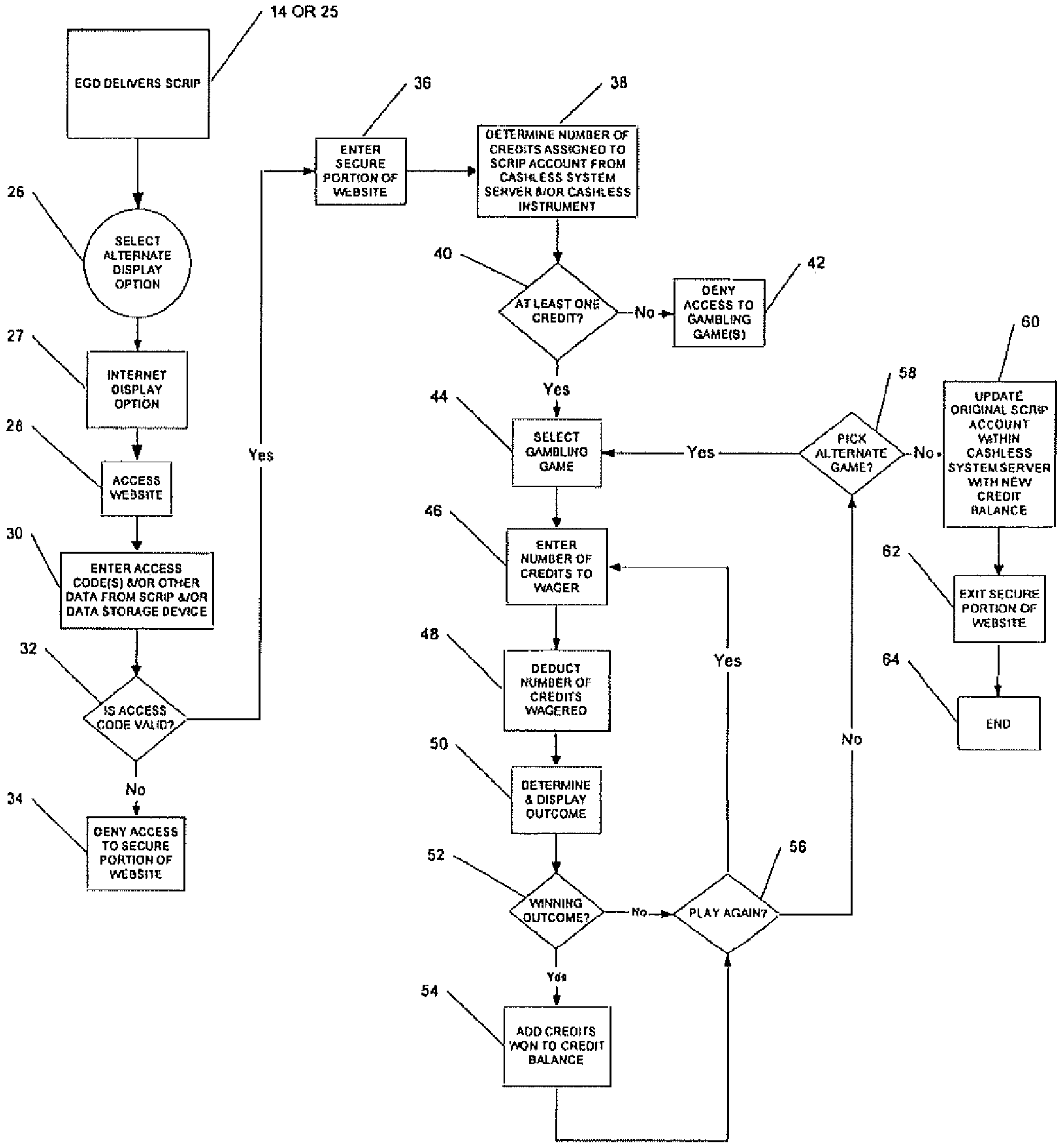
FIG. 1*c* shows a flow chart of an example of the use of an alterative display option for a gambling game outcome in accordance with one embodiment of the present invention.

FIG. 1*c* shows another example of the present invention that generates a variable result for the player. As before, the player has chosen an alternative display option 26. However in this example, the internet display option actually determines the outcome 50 instead of merely displaying undisclosed outcomes as shown in FIG. 1*b*. After the player has finished playing, the scrip account is updated 60 with the new balance based on the results of the game.

Figure 3:
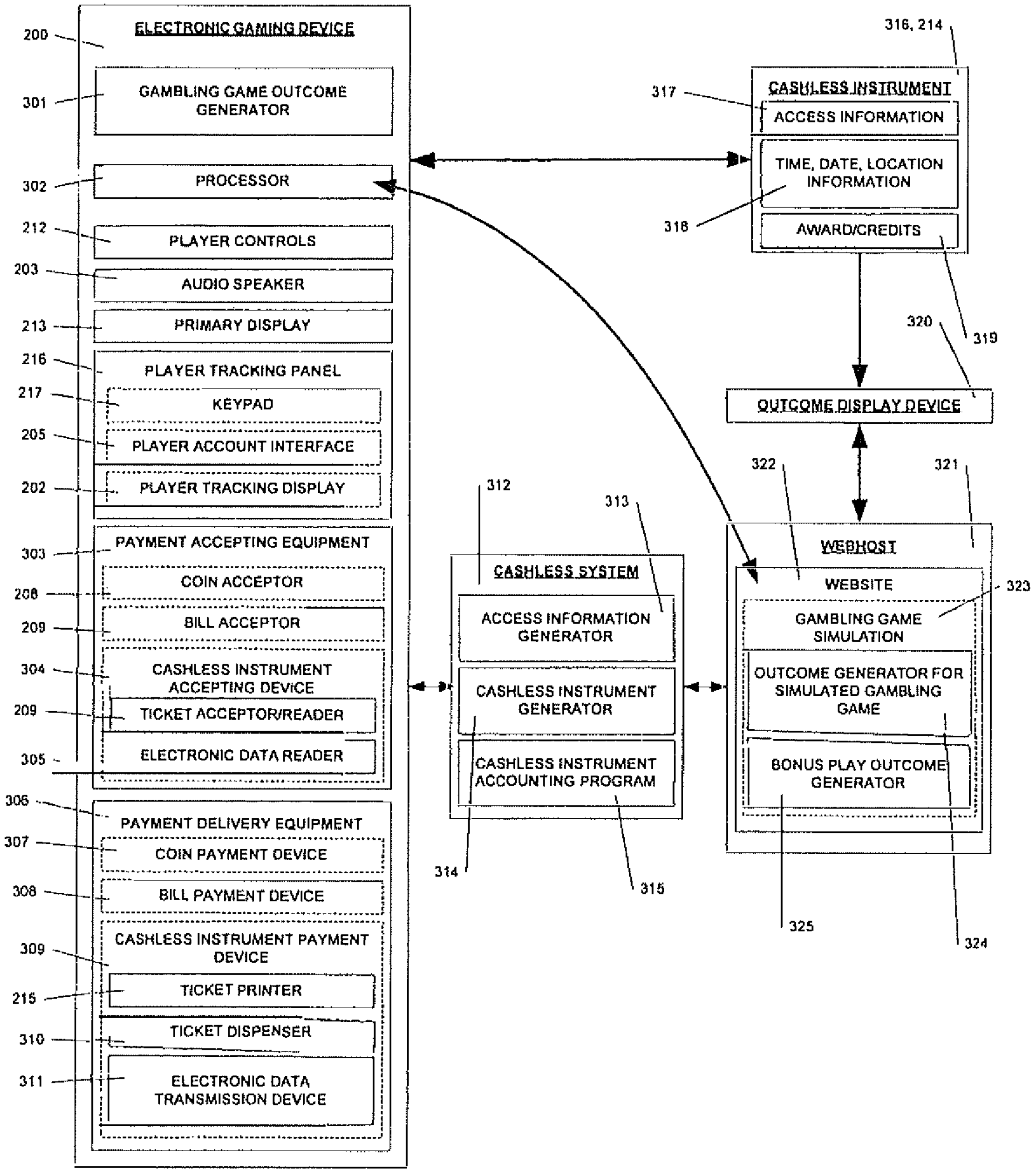
FIG. 3 shows a diagram of an example of an electronic gaming device that provides internet access to a gaming system in accordance with one embodiment of the present invention.
Figure 4:
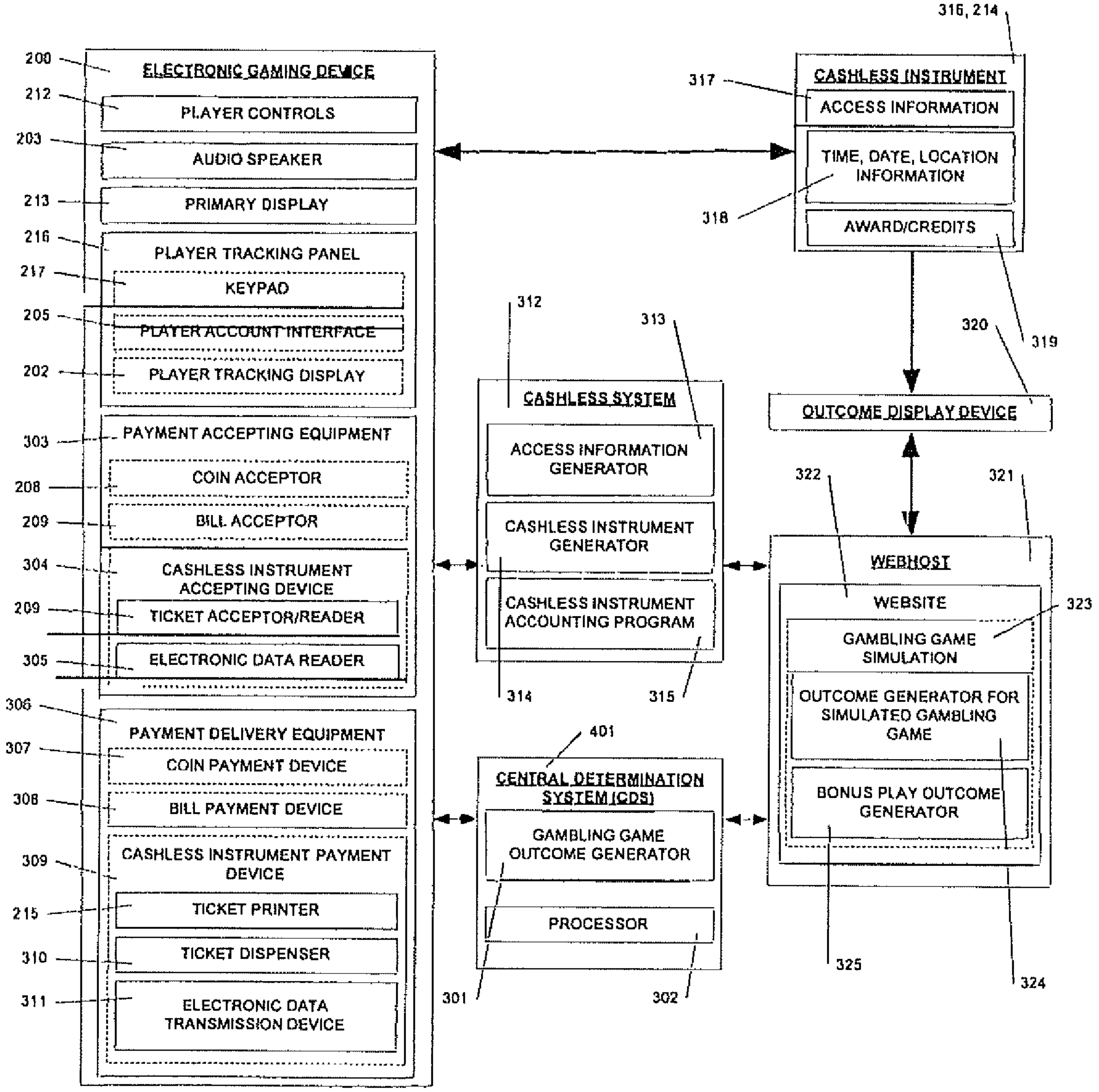
FIG. 4 shows a diagram of another example of an electronic gaming device that provides internet access to a gaming system in accordance with one embodiment of the present invention.
Figure 5:
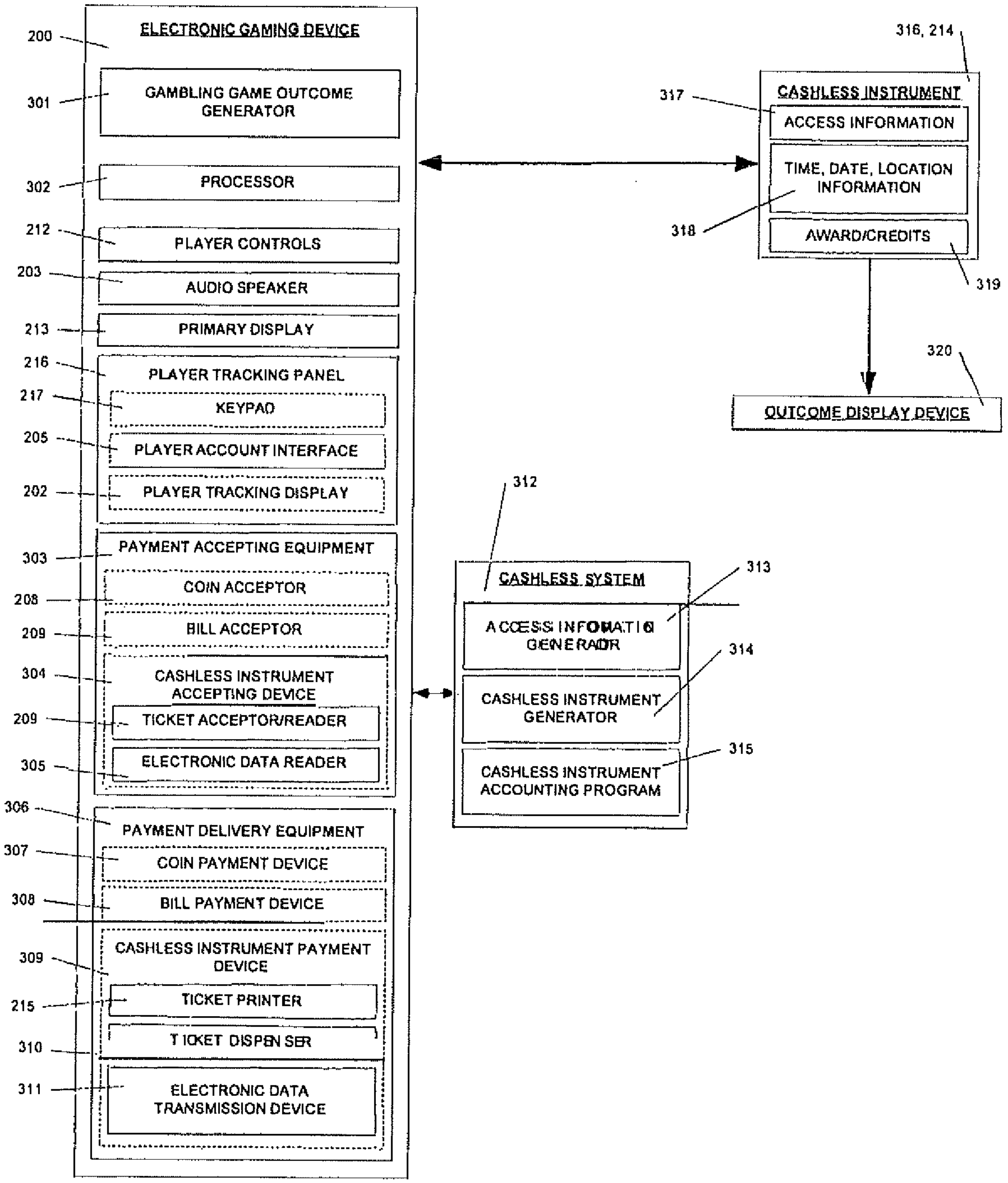
FIG. 5 shows a diagram of an example of an electronic gaming device and an outcome display device in accordance with one embodiment of the present invention.

Examples of the present invention are represented in FIGS. 3, 4 and 5. In FIG. 3, the EGD 200 includes: an outcome generator 301; a processor used to monitor EGD activity and generate commands 302; player controls 212; an audio speaker 203; a display 213; a player tracking panel 216; payment accepting equipment 303 with a cashless instrument accepting device 304; and payment delivery equipment 306. Though the EGD may be in communication with multiple systems such as player tracking systems, progressive systems, etc. the focus of this example is directed to the EGD in connection with a cashless system 312 and an outcome display device 320.

The processor 302 is designed and programmed to monitor, among other things, EGD outcomes. When an EGD and/or CDS is engaged in generating and delivering a group of undisplayed outcomes and their individual and/or cumulative results to a player, the processor 302 will record the outcomes with their relevant data (e.g., value(s), wager, bonus eligibility, bonus outcome, game presentation data, etc.). This data can be accessed for delivery and coding of the cashless instrument and is also available for later retrieval in response to display device requests via a network. The network will likely be secure and use suitable protocols. The network may be any suitable network including a LAN, WAN, intranet, wireless, RF, and/or Internet, etc.

EGD awards/payments for winning outcomes that exceed federal withholding requirements and/or other legal and/or jurisdictional and/or vendor thresholds often require an EGD to enter a "tilt" state in which the machine is rendered unresponsive to the player. In these cases payment may be delayed until an EGD's result is verified by casino staff or other agents (regulators, vendor representatives, etc.). In light of the present invention, if a purchased undisplayed outcome exceeds such a threshold, the EGD may be programmed to display that outcome and enter a tilted state prior to, or in lieu of, issuing a corresponding cashless instrument associated with the undisplayed outcome. Alternatively, the cashless system may simply account for the outcome and initiate any verification procedures, if necessary, without the knowledge of the player.

Using a progressive jackpot as an example, the progressive award can be automatically or manually assigned to the liability file that corresponds to the scrip issued to the player whereafter the undisplayed outcome and its partial or complete value can be displayed to the player, at a later time, by outcome display devices as described herein. If the player's identity is immediately required upon winning an award that exceeds a threshold, it may be preferable for the player to identify himself prior to purchasing an undisplayed outcome. This may be accomplished with approved identification measures that ensure the player of the device is also the holder of the outcome. Such measures may include requiring personal identifiers including signing in prior to purchase, an access code, driver's license comparison or biometric identification data from the player (fingerprints, retinal scan, facial recognition, etc.). These measures may be conducted at any or all points of use such as at an EGD, PC, alternate display device, payment center, award distribution center, cashless instrument, etc. If the verification of a player's identity is only required upon redemption of a cashless instrument, a player may have his identity verified when the scrip associated with an undisplayed outcome that exceeds a given threshold is redeemed.

In the embodiment shown in FIG. 3, a player utilizes an outcome display device 320 in connection with a gambling game simulation program 323 which is employed to display the previously determined outcomes. In order for the gambling game simulation to simulate and/or display the previously determined outcome it will access compiled undisplayed outcome data from the cashless instrument 214, 316 and/or the processor 302 via the Internet, telephone networks, wirelessly, etc. Upon connection, a valid cashless instrument will be verified by the cashless system 312 and/or the processor 302. After verification of the cashless instrument 214, 316 and/or the player, the processor 302 provides at least one specific outcome and credit balance associated with the cashless instrument 316 to the gambling game simulation program 321. At this point the gambling game simulation program is in condition for play. The player will then have the option to select a gambling game, if more than one is available, and simulate placing his wagers and view the simulation of his selected gambling game as it simulates outcomes and/or replays actual outcomes as they occurred earlier though they were undisplayed at that time.

In the example shown in FIG. 4, the EGD outcomes are determined by a central determination system (CDS) 401 that is separate from the EGD 200. This may result in a different communication layout for certain portions of the network. With this example, the EGD 200 does not include an outcome determining mechanism 301, and may or may not house the processor used to monitor EGD activity and generate commands 302. This processor 302 may be incorporated in the CDS or be a part of a separate device and/or system connected to the EGD and/or CDS.

It is to be understood that a player may also have his outcomes revealed by an EGD at a later time if he so desires. This could come about if the player had initially intended on revealing the outcomes at home, for example, but instead returned to the casino where he received the undisplayed outcomes before he had a chance to reveal them at home. In this case the player may want to display the outcomes already purchased prior to, or instead of, wagering additional credits. He would only need to deliver the scrip to an EGD, via a ticket reader or other suitable data transmission connection, on the same network as from before, where the EGD of the present invention is able to display the games associated with the undisclosed outcomes represented on the scrip for play to the player as if they had never been played but where the outcomes displayed are those that were determined at an earlier time.

Another option with the present invention allows the player to continue wagering with the display device and/or system using the winnings he may have acquired with the purchase of his undisclosed outcomes, with or without disclosing the undisclosed outcomes. For example, where one use is to limit the player's winnings and/or losses to a value that is stored in or available through his cashless instrument after purchasing at least one undisclosed outcome from an EGD; another example is to allow the player to wager his winnings, if the cumulative value of his undisclosed outcome(s) is/are more than $0, with a remote gaming engine (RGE) available through the various devices and systems such as those referenced herein. This option will require a dynamic form of scrip accounting in order to update the value represented by the cashless instrument and/or its liability account. It is also to be understood that this type of wagering is not to be limited to wagering winnings from previously purchased wagers such as undisclosed outcomes. Credits purchased at an EGD, or other allowable point of sale, where the player receives an instrument that allows him access to the RGE may also be wagered on-line and redeemed in a similar fashion.

For example, using non-electronic paper scrip with a dynamic scrip account of the present invention can be accomplished, among other methods, by using an on-line, undisclosed outcome display program with a remote game engine (RGE) in connection with a cashless system associated with the EGD that originally delivered the scrip representing the undisclosed outcome(s). If, for example, the original scrip and its related scrip liability account held a value for the player in the amount of $100, the player might wish to wager any or all of the $100 via the on-line outcome display program and the RGE in addition to, or in lieu of, displaying the related undisplayed outcomes. If, after wagering, the value of the scrip changed, the related liability account would be updated to reflect its new balance. The paper scrip, in this example, would then be redeemable for the new monetary value.

The display program, RGE and/or the scrip liability account may also be programmed to allow the player to wager more than the value of the scrip in a credit or debit arrangement including using comp and/or player's club points and/or involving a payment using comp and/or player's club points. Additionally, a negative balance could be paid at the EGD or at any other acceptable location, or in any other acceptable fashion, partially, wholly or manually connected to the cashless system that issued the original scrip and established its related liability account. A player may similarly wager his winnings if using a cashless instrument other than non-electronic paper scrip or tickets. For example, using a digital storage device as a cashless instrument, the player may also wager via a remote gaming engine (RGE).

A remote gaming engine is a gambling game outcome determination processor. It may be located in: an EGD, a CDS, an undisclosed outcome display program and/or device, stand alone-off-line programming available to one of the player's display devices, etc. The outcome determination processor may be accessed via a network, like the Internet, using physical or wireless communication equipment. The RGE will also contain, or work in conjunction with, creative content programming. The RGE may be accessible via a network or via a stand alone device programmed for use with the present invention. In the event a player is utilizing an off-line RGE, his cashless instrument may be updated, or generated (e.g. printed scrip, digital media like CD, USB flash drive, etc.) with credit balance changes to his account and/or the RGE may require a connection to a central scrip liability account to transmit credit balance changes.

In one embodiment, the processor used to monitor EGD activity and generate commands 302 is embodied by an activity monitoring unit (AMU). It is to be understood that it is the function of the processor 302 that is critical to the invention and not its precise construction nor physical location. The AMU is designed and programmed to similarly monitor, among other things, EGD outcomes. When an EGD and/or a CDS are engaged in generating and delivering a group of undisplayed outcomes and their individual and/or cumulative results to a player, the AMU will record the outcomes with their relevant data e.g. value(s), wager, bonus eligibility, bonus outcome, game presentation data, etc. This data can be accessed for delivery and coding of a cashless instrument and is also available for later retrieval in response to game display program requests via a network. The network will likely be secure and use suitable protocols. The network may be any suitable network including a LAN, WAN, intranet, wireless, RF, and/or Internet.

In one embodiment, when a player utilizes an outcome display device 320, it is in connection with a web-based gambling game simulation 323 which is employed to display the previously determined, undisclosed outcomes. In order for the gambling game simulation to simulate the previously determined, undisclosed outcome(s) it will access compiled undisclosed outcome data stored in a memory device controlled by the processor 302, tasked to handle the activity monitoring and command generating functions for the EGD and/or the CDS, via a secure Internet connection. Upon connection, a valid cashless instrument will be verified by the cashless system 312 and/or the processor 302.

After verification of the cashless instrument, the processor 302, in concert with the cashless system 312, provides at least one specific outcome and related data (e.g. size of wager(s), win/loss information, outcome, total number of credits played, EGD location, gaming establishment, time and date of issue, game program, game theme, game presentation data, bonus data, player information, etc.) associated with the cashless instrument to the gambling game simulation program 323. The player will then have the option to select a gambling game, if more than one is available, and simulate placing his wagers, playing the game, and viewing the simulation of his selected gambling game as it simulates and/or replays actual outcomes that occurred earlier though they were undisplayed at that time. Additionally, the display device of the present invention may offer the player a choice between applying the credit balance and allowing the display of the outcomes prior to informing the player of the associated credit balance so as not to spoil the ending for the player.

An EGD of the present invention can display outcomes that were determined at an earlier point in time upon receiving the necessary data from, or through, the cashless instrument containing the data related to those outcomes. A gaming system, such as a video lottery or bingo system, can be established where there would exist at least one EGD and/or system that allowed the purchase of at least one undisclosed outcome where the EGD would deliver to a player at least one cashless instrument for use with EGDs of the "proxy display" variety, such as some types of: 1) video lottery terminals (VLTs); or 2) class II and III gaming devices. These will be located in a jurisdictionally approved site and/or will be for use with alternate outcome revealing devices. One potential use for such an arrangement is for jurisdictions that limit the number of EGDs a given licensee may operate. If, for example, a gaming operator were limited to 500 EGDs, the operator could place 500 EGDs that, independently or in concert with a central system, generate undisclosed outcomes and, additionally, place any number of display devices that could have any appearance including identical external appearances, player interface and display qualities as the allowable EGDs. The display devices could be operated to display the previously purchased undisplayed outcomes in a manner that, from the player's perspective, simulates playing a traditional EGD. In this way, the operation can effectively meet its market's demand for gaming positions while complying with its jurisdictional limits on quantity of EGDs.

This example fits well with present day Native American casino systems such as those found in the State of Washington where cash must be converted to scrip for use with EGDs connected to a CDS. The EGDs in at least some Washington casinos only accept scrip for wagers. The scrip is issued from a single purpose device which is connected to the cashless system. This device accepts cash and issues scrip with an equal value. In this example, the device that converts cash to scrip, in concert with its CDS and/or cashless system, could generate undisplayed outcomes and store them, in whole or part, in a system based, scrip account or on the scrip itself. Thereafter, the devices "played" would be simply display devices with at least the ability to accept and deliver scrip. In one example, when scrip is inserted into a display device, the CDS would access the relevant scrip account and display an outcome to the player thereafter updating the scrip account to be representative of the value assigned to the remaining undisplayed outcomes and/or crediting the display device. If a winning outcome were purchased and displayed the credits won could be assigned to another scrip account where the appropriate number of new undisplayed outcomes could be generated simultaneously. Additionally, scrip can be issued for payment for all winnings displayed at the time a player decides to stop displaying outcomes; as to any remaining undisclosed outcomes, the credits wagered may be refunded or the balance of the undisclosed outcomes may be paid out as if they had been displayed to the player. In the case of a progressive award, a separate scrip account can be created where the corresponding scrip would be delivered to the player via the display device, or the progressive award can be delivered by casino personnel.

The outcomes may be revealed by an EGD or by alternate display devices. As previously described, for all alternate display devices and/or systems, the credit balance associated with the scrip may or may not be shown to the player depending on the programming of the display device and/or system and/or the player's choice prior to displaying the outcomes. In addition to EGDs, display of the outcomes of the present invention may be through devices and systems such as: PCs, cellular telephones, PDAs, video game console platforms (e.g., XBOX, PS2, Gamecube, etc.), hand held video game platforms (e.g., Gameboy, Sony PSP, Nintendo DS, etc.), Internet websites, interactive TV, etc. For Internet capable devices the display program may be a web-based program provided by a casino, or its agent, housing the EGD(s) that provided the undisclosed outcomes via scrip.

In one example, the website requires identifying data from the scrip. Once provided, the website can access the casino system to determine the games originally wagered on, the number and size of the wagers, and their outcomes. Alternatively, the website program, similar to a stand alone program, can acquire this information without accessing the casino system so long as the necessary qualifiers are represented by the scrip, or other data based medium, and can be transferred to the website program. Additionally, the data entered from the scrip may only need to communicate the number and size of the wagers and their outcomes or cumulative outcome and thereafter allow the player to select the games he wants to play. The program will then apply the previously determined outcomes or cumulative outcome to those games.

The outcome display programming, regardless of its location, may house a library of gambling games from which the player may choose to reveal his previously purchased outcomes. The gambling game may or may not be required to be the same type of game found on the EGD from which the undisplayed outcomes were originally purchased. In fact, the EGD may or may not have offered a particular program or programs to choose from or play; these and all other limitations may be left, in whole or part, to the display programming of the display device.

A theoretical payback percentage can be applied to an undisplayed outcome(s). A corresponding pay table may be representative of all games offered by the display device and/or system. Alternatively, the pay table may be adjustable for particular games offered by the display device and/or system so long as the net credit balance of the undisplayed outcome(s) is achieved.

The display program may be a program that can be downloaded from a website or installed from a CD, DVD, flash memory device or proprietary data storage device such as those used with most hand held game platforms, etc. In this case, the program can work independently from a web-based program and/or a casino system, or it can work in concert with one or both, so long as the display program is functional with the outcome related data and/or qualifiers available on or through the scrip. The same is applicable for devices such as PCs, cellular phones, PDAs and game consoles that have Internet capability and the ability to operate with installed programs. Hand held game platforms such as Sony's PSP and/or custom hand held electronic games (the latter generally mass produced and used for single purpose games such as poker, solitaire, etc.), have the ability to operate with installed programs and/or integrated programs that can also display the outcomes.

It is important to understand that some of these examples give the player an experience of gambling in the present even though the wagers were purchased and the outcomes were determined in the past. The alternative display of the outcomes can provide an experience that is close to, or identical to, that of playing an EGD in a casino at a later time or without being there. A gambling game's creative content can easily be modified or simulated for an alternate display device or system.

Additional game material may be offered for players of the alternate displays. Alternate display outcome information, data, prizes, bonuses, entries, etc. may also be printed from the player's home printer. For example, with some undisplayed outcome embodiments, any instance or combination of games, plays, wins, losses and bonuses, etc. can occur with the alternate outcome display mechanisms so long as the net result of the activity equals the value previously assigned to the cashless instrument by the EGD.

Undisclosed outcome display programming for card games such as all variations of poker and Blackjack are also possible. For example, an undisplayed outcome for a partially skill based game could be provided automatically by the EGD outcome determining device by utilizing optimal play selections on behalf of the player. Partially skill based game payback percentages are typically based on "optimal" play by the player. That is, typically the theoretical payback percentage is the highest possible actual payback percentage after a certain number of plays, a.k.a. a "cycle", have occurred with a particular program. Over that "cycle" of plays, the player can only negatively affect the actual payback percentage as compared to the theoretical payback percentage by making less than optimal play selections; his actual results cannot exceed the theoretical payback percentage over a full game "cycle". If the player with previously purchased, undisplayed outcomes operated a display program with less than optimal skill the result could be the display program showing fewer credits for the player than are actually credited to the scrip. In this case, the difference could be made up by bonus plays or bonus screens until the player's display program credits matched the actual number of credits assigned to the scrip. The display program may also show the deficit and the actual number of credits assigned to the scrip though the value of the scrip will remain unchanged. This may be done to help teach optimal play strategy for "skill based" EGD's. The hands where the player made less than optimal selections may be shown again to point out mistakes and to show the optimal choices that should have been made.

Card games such as poker and Black Jack, for example, can simulate multiple virtual players, and/or a virtual dealer, gambling at a virtual table with the actual player or his avatar. In one example, the actual player's outcome will have been determined when the undisclosed outcome was generated. For example, if the actual player's undisclosed outcome amounted to ten dollars won, the simulated poker or Black Jack game will result in the player winning a hand and/or pot valued at ten dollars. The presentation or the virtual players' and/or virtual dealer's hands will be calculated to mimic winning or losing hands, in relation to the actual player's hand and relative to the rules of the game being used for display purposes and the actual player's previously determined, winning or losing, undisplayed outcome. Furthermore, the present invention enables multiple players of a gambling game to compete against one another using their respective undisplayed outcomes. In a poker game example, a player can purchase an undisplayed outcome, or "hand" at the casino where each possible hand is ranked relative to the particular game's rules. The player is then able to engage one or more players who also have undisplayed outcomes. The players' display devices will display each player's position and cards as they are revealed. An algorithm in the system will calculate finishing positions for each of the players based on their undisplayed outcomes. The final ranking of the "hands" will be translated to corresponding faces of cards, consistent with the game, for the players to see in the order they are revealed. The winner will have the winnings, and or a bonus, associated with his predetermined outcome revealed in the form of a "pot".

It is to be understood that something of a reverse flow, where jurisdictionally appropriate, may also be employed. In this example, undisplayed outcomes or displayed outcomes may be purchased in advance of a trip to a casino. The player may desire to wager, for example, via a casino's Internet web site prior to visiting the casino. The player would either purchase credits, draw on an existing credit balance (scrip or other), player tracking balance, etc. The player would then select a game, make a wager, and play the game. Then the casino system would engage an appropriate outcome determining device to generate the outcome for the game.

If the outcome were to be displayed it would be simulated on the player's PC where the player might be required to visit the casino in order to collect his or her winnings. If the outcome were to remain undisplayed or partially undisplayed, the player would be required to go to the casino in the future in order to have the game outcome displayed by an EGD of the present invention. Additionally, a partially undisplayed outcome may entice a player to visit a casino sooner. Partially displaying an outcome may also be an effective method to further comply with Internet gambling laws and regulations. In both cases the outcome would be stored by the appropriate EGD system(s) and/or cashless instrument for future player redemption and outcome display purposes after appropriate identification of the player and/or delivery of required data from a cashless instrument/electronic data storage device. Electronic data storage devices may be employed for player verification and outcome matching purposes.

For example, after an outcome is purchased, the system may send a data key to be stored on an appropriate device or instrument. The key could be in the form of a bar code printed from the player's printer or it may be a digital key stored on some form of electronic media e.g. CD, DVD, floppy disk, USB flash drive, SD memory card, other compact flash devices, PCMCIA card, etc. At the casino, the data key may be verified by an attendant, a device for that purpose, or by a properly equipped EGD prior to displaying an outcome or redeeming credits.

Another use for the present invention involves a player earning undisplayed outcomes based on the player's gambling activity, inclusive of all standard player tracking measures like: "coin-in", win/loss record, the number of visits made within a given period of time, time of day playing, randomly, the player's responsiveness to promotions or invitations, group classifications, etc. The earned undisplayed outcomes can be accumulated with or without the player's knowledge at a rate and in a fashion determined by the operator. The number of earned undisclosed outcomes and their cumulative value may or may not be made available to the player, at the operator's discretion and within jurisdictional guidelines. The undisclosed outcomes can be mailed, emailed, made available through an on-line player account, instant messaged, provided through an EGD via a cashless instrument, electronic storage media, etc. to a player for remote revelation of the outcomes or for revelation on an EGD at the gaming establishment. If the outcome is revealed off-site, redeeming a winning outcome may or may not require a return visit to the casino. The undisclosed outcome and/or its value may be provided in a form that is redeemable or tenderable at locations other than the gaming establishment. For example the undisclosed outcome and/or its value may be delivered in the form of a check or bank draft, a gift card to an alternate place of business, a coupon, a credit to the player's credit card account, a pre-funded credit card, etc. A related cashless instrument may be generated by the player with a home printer, for example, or a digital based cashless instrument that can be updated with relevant data (e.g. value of scrip, cashless instrument identifying information, player identifying information, casino information, scrip liability account matching information, etc.). In the case of an EGD delivering earned undisclosed outcomes to a player, the value/balance associated with the undisclosed outcomes may be in the form of credits that must be played off the EGD and cannot be cashed out. Similarly, the value/balance may be delivered via a cashless instrument whose credits must be played versus cashed out. Alternatively, the EGD can deliver the undisclosed outcomes via a cashless instrument in various forms and methods including those described herein.

The value associated with a cashless instrument may be redeemed online, for example. In one embodiment, after the player has accessed a website (e.g. 28 or 322) and provided the cashless instrument's identifying and/or quantifying data, the site may make available to the player various redemption options including cash, bank drafts, crediting functions, coupons and award selections including merchandise. The player could select any merchandise or item available for order, delivery and/or pick-up. A short list of examples includes, jewelry, appliances, electronic equipment, vehicles, consumables, etc. The items may be provided at discounts that the player might not enjoy without using a cashless instrument through a given operator's system. After the player utilizes some or all of the value initially associated with the cashless instrument, the liability account associated with the cashless instrument will be updated with the new value balance. Another option will be for another cashless instrument and related liability account to be generated with a value equal to the remaining value of the original cashless instrument while simultaneously closing the original liability account. The new cashless instrument may be printed by the player on his home printer, for example. Another option is for the player's data storage device or electronic cashless instrument, if different, to receive a new digital value in response to the transaction and in relation to the new liability account. The data storage device will also be capable of maintaining a record of the transactions including the exchange of value for any web based item or merchandise.

Player tracking award systems typically allot points to a player's account based on tracked wagers. These points are typically redeemable for cash, credits, coupons, merchandise, etc. Some operators and systems allow a player to have access to, and control of, at least some of their points to redeem as the player chooses. Additionally, some points may be accumulated, accounted for, and saved without the player's knowledge for reward purposes intended to make the player feel special (such as complimentaries, a.k.a. "comp points") or as a form of insurance that can be used to offset the cost of placating the player if he is disgruntled some time in the future, encouraging him to visit after a long period of inactivity, etc. With the present invention, player points could be applied to purchasing undisclosed outcomes in lieu of, or in addition to, point accumulation for purchasing or being awarded standard awards.

For example, once an undisplayed outcome is earned, the EGD or CDS generates the undisplayed outcome automatically, with or without the player's knowledge, from any game, or group of games, the EGD operator chooses. In this example, the cost of the wager is deducted from one of the player's accounts prior to the undisplayed outcome's generation. Undisplayed outcomes such as these can be "banked" by the casino, with our without the player's direct knowledge, and thereafter be given to the player. An undisplayed outcome may be delivered to a player immediately while he is playing an EGD, similar to a free play, or via a cashless instrument. The undisclosed outcome can be delivered through the mail in the form of a cashless instrument, emailed, or delivered in any other reasonable manner, including the examples disclosed in other parts of the specification. The game program used to display the undisplayed outcome may be a new game, one the player has not played, or any other game available as determined in advance by the relevant regulatory body, casino operator, EGD manufacturer or an agent of any, etc. (The EGD operator may have a desire to introduce the player to a new game and prefer to utilize this method in place of other, less direct, introduction techniques. Furthermore, the game chosen may have a particular payback percentage, pay table, etc. to result in a planned experience for the player. This could be done in place of sending a coupon with a given value so that the player receives the same or similar value after having the opportunity of revealing an undisplayed outcome.) In essence, the player will have chosen to make the wager with the player's club points, by virtue of enrollment in the player's club or otherwise, and allowed the operator to pick the game in this example. And at some point in the future the player will be allowed to reveal the associated outcome, winning or losing, experience the game and redeem his points, whether or not the player is in the casino. Additionally, a casino may budget a target amount for an advertising promotion where the amount budgeted will equal, more or less, the cost of paying out players' earned or won undisplayed outcomes. The odds for the outcome generation program used to generate the undisplayed outcomes for this promotion can be set to provide a minimum award for all recipients, randomly determined awards (including large awards), etc.

Undisplayed outcomes may also be won as part of a standard payout function or as a bonus. The won undisplayed outcomes can be accumulated with or without the player's immediate knowledge. The won undisclosed outcomes and their cumulative value may or may not be made immediately available to the player, at the operator's discretion and within jurisdictional guidelines. The undisclosed outcomes can be mailed, emailed, made available through an on-line player account, instant messaged, and provided through an EGD via a cashless instrument, etc. to a player for revelation of the outcomes. In this case, revealing and/or redeeming any winning undisclosed outcomes may or may not require a return visit to the casino. The undisclosed outcome and/or its value may be provided in a form that is redeemable or tenderable at locations other than the gaming establishment. For example the undisclosed outcome and/or its value may be delivered in the form of a check or bank draft, a gift card to an alternate place of business, a credit to the player's credit card account, a pre-funded credit card, etc. A related cashless instrument may be generated by the player with a home printer, for example, or a digital based cashless instrument that can be updated with relevant data (e.g. value of scrip, cashless instrument identifying information, player identifying information, casino, scrip liability account matching information, etc.). In the case of an EGD delivering won undisclosed outcomes to a player, the value/balance associated with the undisclosed outcomes may be in the form of credits that must be played off the EGD and cannot be cashed out. Similarly, the value/balance may be delivered via a cashless instrument whose credits must be played versus cashed out. Alternatively, the EGD can deliver the won undisclosed outcomes via a cashless instrument comprising various forms and/or methods including those described within this disclosure.

The EGD of the present invention may be constructed from the ground up to include the necessary components, connections, programming, etc. in order to function as described herein. Alternatively, an existing EGD may be retrofitted, such as with an Activity Monitor Unit (AMU) and related equipment, to achieve the same level of functionality.

For example, using a typical video slot machine such as those found in Nevada casinos, an AMU can be connected to the EGD at various points between the EGD's main processor and the EGD's peripheral devices. In this case, the peripheral devices include at least the display monitor, all audio speakers, and the cashless instrument generator. The AMU can also be connected via a network to a central processor and memory storage device. For example, when a player makes a wager the AMU will command the video display to ask the player whether he wants to purchase an undisclosed outcome. If the player consents, the AMU will release the EGD to generate an outcome. At the same time the AMU will block the outcome and the game play from being displayed on the video screen and audibilized, etc. while substituting suitable creative content through the display and audio system, etc. The AMU will also block the EGD from initiating payment and crediting of the EGD in the case of a winning combination. The AMU will then send the outcome display and audio data as well as credit balance, EGD identification information, etc. to the central processor via the network. The AMU will also allow credit information to be forwarded to the cashless system processor. However, the AMU will intercept the cashless system's standard printer command. Thereafter, the AMU will command the EGD's cashless printer to issue scrip with all normal data without prominently displaying the credit balance. Additionally, the AMU will command the printer to include access codes, identification data, and outcome data for use with the later revelation of the undisplayed outcome. Upon returning to the casino for redemption, the player merely inserts the ticket in the EGD's bill acceptor as he normally would and the credit value of ticket will be allotted to the EGD in a typical fashion.

With the programmability inherent in the AMU and the programmable sound card for electronic devices, alternate creative content can be output during the process of generating and delivering an undisplayed outcome just as with the processor used to monitor EGD activity and generate commands.

It is to be understood that the processor 302 or AMU can command all peripheral devices it shares with an electronic gaming device (EGD), peripheral devices for which it is the sole command device, peripheral devices it shares with other equipment and/or systems, etc. An example of commanding EGD peripherals is when the processor 302, upon occurrence of an event, or series of events, commands the EGD video display system and audio system to output bonus related animation, and corresponding audio for a player. The player would then engage player controls, if necessary, and make selections. Thereafter, the processor 302 would command the EGD's video and audio systems to present the bonus outcome with corresponding video and audio outputs such as an animated lottery drawing, etc. The bonus outcome itself can be pre-selected and stored in memory or it can be generated by programming in the processor 302 itself or generated by a connected peripheral device programmed, or otherwise able, to generate and/or deliver a bonus outcome to the processor 302 (e.g. a random number generator (RNG), an EGD RNG, pre-selected table, drawing, etc. Thereafter, the processor 302 may command a printer, cashless system, player tracking system, dispensing device, payment device, data based award delivery device or other device, to generate and/or deliver an award to the player, if the previously generated/pre-selected bonus outcome entitled the player to such award.

Throughout this process the EGD's non-bonusing activities and/or outputs will be interrupted, or reordered, to allow the bonusing routines to finish prior to resuming normal activities and/or inputs and/or outputs. This may occur by pausing the circuit board's normal programming routines, interrupting the circuit board's communications with the EGD's various component parts and delaying their command execution or it can similarly be accomplished by simply adding the bonusing routine elements to the EGD processing queue in the appropriate order and allowing the EGD processor, or the processor 302, to execute the bonusing routines independent of the game outcome processing using programming and/or circuitry tools and/or configurations including logic gates, application programming interfaces (APIs), HKEYs, hashing, etc. to maintain a level of separation (if desirable) between an EGD's critical functions and other functions such as bonusing, peripheral device functions, etc.

In one example, the video files, audio files, executable programming, bonus outcome generation programming files, etc. are stored in memory separate from that of the EGD's game logic circuitry and/or programming. The memory storage device may be proximate to or contained by the processor 302 or it may be available via a network connection. Such configurations separate creative content from the EGD's game logic circuitry and/or programming and are employed so that the creative content and/or its programming can be modified and/or updated, either directly or via a network connection, without impacting or otherwise affecting the more sensitive game logic circuitry and/or programming.

It is to be understood that all creative content and/or peripheral programming for an EGD can be handled in a similar fashion, that is, separated from the EGD's critical components and/or programming. This arrangement need not be limited to creative content and peripheral programming, etc. used with bonusing. It would also be beneficial to maintain such a separation to more easily and efficiently modify all levels of creative content and/or peripheral programming whether or not modifying the game outcome programming, etc.

It should also be understood that it is the function of the programmable activity detector and command generator (AMU) and/or the processor 302 that is/are relevant to the present invention and not its/their precise construction, location, etc. In fact, so long as the AMU and/or the processor 302 function(s) as described, including not interfering with the EGD's game outcome determination, the function(s) of the AMU and/or the processor 302 may be carried out by any device or software construct within an EGD or EGD system with or without unidirectional information transfer.

Using a separate device like an AMU offers numerous benefits. One of these benefits is the ability to use the AMU as a universal controller for all of the peripheral devices employed by an EGD. As mentioned, this separation of the critical outcome determination logic from most, if not all, of the remaining functions of the gambling device makes for easier updating of non-critical functions and can expedite regulatory review processes.

Embodiments of the present invention include use in gaming devices and gambling games such as: a slot machine; video poker; keno; video 21 or "Blackjack"; a video lottery terminal (VLT); a video lottery system; a game that is controlled by a central determinant system; any other video game; a playing card game; a card shuffler; or a table game.

Other embodiments of the present invention include a bonusing system that generates a bonus without impacting the generation of the gambling device game outcomes but that is responsive to events that occur within the gambling device. The bonus system could be integrated into the gambling device or a detachable module that could be included as an "add on" modification to an existing game.

Notification of an award or bonus could occur via video, audio or other peripherals of the gambling device. A video notification of an award could manifest itself as any simulated, or actual, outcome, for example, a lottery drawing graphically displayed on the EGD monitor or another display. The bonus could be awarded as pre-printed materials such as a coupon, "scratch-off" ticket, etc. The pre-printed materials are typically awarded by a dispensing device. Tangible prizes can also be delivered by a dispensing device. Alternatively, the bonus could be awarded by a printer that prints bonus materials such as a lottery entry, lottery award, credits redeemable by an EGD, etc.

It should be understood that a wide variety of embodiments are covered with various combinations of the elements of the present invention. While the invention has been described with respect to a limited number of embodiments, those skilled in the art, having benefit of this disclosure, will appreciate that other embodiments can be devised through various combinations of elements of the invention which do not depart from the scope of the invention as disclosed here. Accordingly, the scope of the invention should be limited only by the attached claims.

What is claimed is:

1. A method for tracking and analyzing activity of a player of a casino gambling device located in a casino by a player tracking system in information communication connection with the casino gambling device via an interface that does not allow the player tracking system to affect game logic circuitry of the casino gambling device, comprising:

receiving information that identifies the player to the player tracking system;

electronically tracking and storing information about casino gambling device activity of the player via the information communication connection between the player tracking system and the casino gambling device;

electronically receiving and storing information about activity of the player that occurs away from the casino originating from a portable, personal, communication device possessed by the player;

analyzing the stored gambling device activity information in combination with the stored information about the player's activity away from the casino; and the player tracking system electronically communicating with the player through at least one of an output device of the casino gambling device located in the casino and at least one of a social media account, an email account, and a text messaging account, that is accessible by the player.

2. The method of claim 1, wherein storing information about casino gambling device activity of the player comprises storing a selection of a mode of play the player desires, and wherein the mode of play is indicative of one or more of a value of a wager, a number of games to be wagered on, and a specific game to be wagered on.

* * * * *